United States Patent
Bramwell

[11] Patent Number: 5,715,011
[45] Date of Patent: Feb. 3, 1998

[54] TRANSITION RATE DEPENDENT DATA SLICER

[75] Inventor: Simon D. Bramwell, Huissen, Netherlands

[73] Assignee: U.S. Philips Corporation, New York, N.Y.

[21] Appl. No.: 635,806

[22] Filed: Apr. 22, 1996

[30] Foreign Application Priority Data

Apr. 22, 1995 [GB] United Kingdom ............... 9508209

[51] Int. Cl.⁶ ........................................... H04N 7/087
[52] U.S. Cl. ........................................ 348/465; 348/468
[58] Field of Search .................... 378/464, 465, 378/468, 461; H04N 7/08, 7/087

[56] References Cited

U.S. PATENT DOCUMENTS

| | | | |
|---|---|---|---|
| 4,318,128 | 3/1982 | Sauvanet | 348/465 |
| 4,667,235 | 5/1987 | Nozoe et al. | 348/468 |
| 5,483,289 | 1/1996 | Urade et al. | 348/465 |
| 5,506,626 | 4/1996 | Yagi et al. | 348/454 |
| 5,567,469 | 10/1996 | Schultz | 348/465 |

*Primary Examiner*—Victor R. Kostak
*Attorney, Agent, or Firm*—Robert M. McDermott

[57] ABSTRACT

A data slicer for data transmitted during given lines of a television signal comprises a subtractor to which the input data is applied at a first input and a slicing level is applied at a second input. The sliced data is fed to an offset generator which generates the slicing level. A transition detector controls a switch which causes the offset generator to generate either a fixed offset derived from a history of the received data amplitude or a zero offset. The arrangement is such that for teletext data a fixed offset is applied at the start of a line, zero offset is applied during the clock run in period, and a fixed offset is then used to slice the NRZ data. For biphase data such as VPS or PAL plus signalling data a zero offset is applied for the duration of the data packet.

10 Claims, 2 Drawing Sheets

TRANSITION RATE DEPENDENT DATA SLICER

BACKGROUND OF THE INVENTION

1. Field of the Invention

The invention relates to a data slicer for generating a digital data stream from teletext and other data signals transmitted during given lines of a television signal, the data slicer comprising a subtractor having a first input for receiving the transmitted data signal, an offset generator, having an input connected to the output of the subtractor, for generating an offset value related to the average data amplitude over a given period, means for coupling the output of the offset generator to a second input of the subtractor via a low pass filter, and means for deriving the digital data stream from the output of the subtractor.

The invention further relates to a teletext decoder including a data slicer

2. Description of the Related Art

A data slicer known in the prior art has been used for teletext data and uses an offset generator and low pass filter to generate a slicing level and a subtractor to perform the slicing. These units form a loop whose function is to find and extract the d.c. content of the signal. Thus only the digital data which was encoded in the transmission is left enabling serial digital data to be produced at the output. The function of the offset generator is to allow accurate slicing of data which contains few transitions over an entire packet as can occur with a non return to zero (NRZ) code as used in teletex transmissions. A fixed offset (whose magnitude is based on long term observation of the data signal) is added to or subtracted from the sliced waveform depending on whether the signal is low or high. This has the effect of maintaining a good noise margin even after long periods of unchanging data.

Many other types of data are now being transmitted with television signals. These include Video Programming Signals (VPS), PAL plus signalling data, and closed caption data together with the various versions of teletext which include as well as World System Teletext (WST), North American Broadcast Teletext System (NABTS) and Japanese Teletext.

Consequently transmissions may be received which include not only NRZ codes but also codes having frequent transitions such as Biphase codes which are used for VPS and PAL plus signalling data. While data slicing techniques described above are particularly suited to NRZ codes they have been found to be less than ideal when used to slice data which has a high transition frequency.

SUMMARY OF THE INVENTION

It is an object of the invention to enable the provision of a data slicer which is capable of handling data having either a low or a high transition rate.

The invention provides a data slicer for generating a digital data stream from teletext and/or other data signals transmitted during given lines of a television signal, the data slicer comprising a subtractor having a first input for receiving the transmitted data signal, an offset generator, having an input connected to the output of the subtractor, for generating an offset value related to the average data amplitude over a given period, means for coupling the output of the offset generator to a second input of the subtractor via a low pass filter, and means for deriving the digital data stream from the output of the subtractor, characterised in that the data slicer further comprises means for detecting the first data transition in a given portion of a television line, means for applying a zero offset from the offset generator during the clock run in period of teletext data and during a whole television line for data which has frequent transitions, and means for applying an offset value from the offset generator during the non return to zero portion of the teletext or for any other received data having a low transition frequency.

By providing two possible modes of operation, that is with either an offset applied to the subtractor for NRZ codes or zero offset when biphase or other codes with a high transition frequency are being sliced an optimum slicing level can be obtained to give the best noise margin and consequently the most reliable data detection. While the whole of the WST teletext signal is encoded in a non return to zero code during the clock run in period an alternating series of "1"s and "0"s is transmitted and consequently a high transition rate occurs during that time. As a result it is advantageous to apply a zero offset during the clock run in period of a WST signal and to revert to the offset at the end of the clock run in period after which a low transition frequency is possible.

The data slicer may comprise means for detecting each data transition in the given television line or a predetermined portion thereof and means for applying a zero offset for a short time after each transition. The short time may be less than or equal to four bit periods and is preferably less than or equal to two bit periods.

In this way it is possible to detect data patterns which result in a high transition frequency even with NRZ codes and to apply dynamically the best data slicing technique for the data being received.

The invention further provides a teletext decoder including such a data slicer.

BRIEF DESCRIPTION OF THE DRAWINGS

The above and other features and advantages of the invention will become apparent from the following description, by way of example, of embodiments of the invention with reference to the accompanying drawings, in which.

DETAILED DESCRIPTION OF THE PREFERRED EMBODIMENTS

Figure 1:
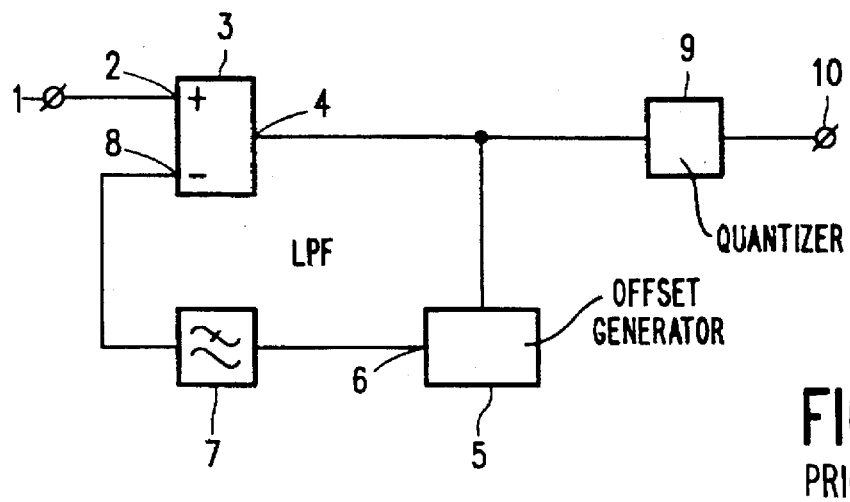
FIG. 1 shows in block schematic form a known data slicer.

FIG. 1 shows in block schematic form a known data slicer which has been used to slice teletext data. It comprises an input/to which the transmitted data signal is applied and which is connected to a first input 2 of a subtractor 3. The output of the subtractor 3 is fed to an offset generator 5 whose output 6 is fed via a low pass filter 7 to a second input 8 of the subtractor 3. The sliced data is fed to a quantiser 9 which produces a digital data stream and is connected to an output 10.

The subtractor 3, offset generator 5 and low pass filter 7 form a loop whose function is to find and extract the d.c.

content of the signal so that only the digital data which was encoded in the transmission remains. The quantiser is included simply to convert the sliced waveform into serial digital data. The function of the offset generator is to allow accurate slicing of data which contains few transitions over an entire packet. A fixed offset, whose magnitude is based on long term observation of the data signal, is added to or subtracted from the sliced waveform depending on whether the signal is low or high. This has the effect of maintaining a good noise margin even after long intervals of unchanging data.

Figure 2:
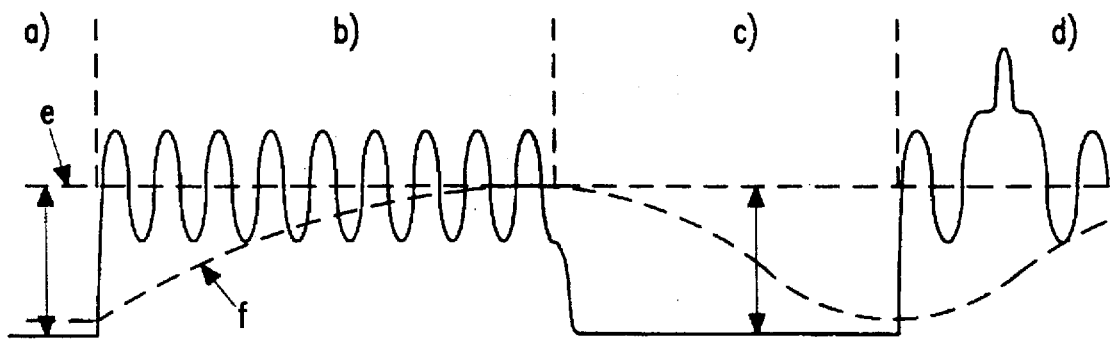
FIG. 2 illustrates the performance of various data slicing algorithms on teletext signals

FIG. 2 illustrates the operation of the data slicer with data having few transitions. It shows part of a line period starting with a portion a) in which the input is at black level. The clock run in portion b) which consists of an alternating series of logic "1"s and "0"s then occurs, followed by a portion c) of data having no transitions, and then a portion d) in which data having some transitions, which may be distorted by echoes etc. is received.

When an offset is applied to the subtractor 3 a slicing level as shown as dotted line e is produced which, as can be seen, passes through the mid point of the clock run in waveform and is maintained at a relatively constant level during portions c) and d) of the line period. As has been stated before this offset level is derived from a long term observation of the data waveform. If, however, a zero offset is applied the slicing level follows line f, which is determined by the time constant of the lowpass filter 7. As can be seen during portion b) the slicing level slowly rises but only the later cycles of the clock run in are accurately sliced. During portion c) the slicing level slowly falls but in this instance the data will be correctly sliced. Towards the end of portion c), however, the noise margin becomes rather small. During portion d) the slicing level starts below the ideal level and may miss some data transitions particularly if they have low amplitude due to echoes or other transmission effects.

It can, therefore, be seen that it is advantageous to apply an offset in data slicing teletext data which will frequently contain portions where there is a low transition frequency, but where a high transition frequency occurs the advantages of the offset method do not apply.

Figure 3:
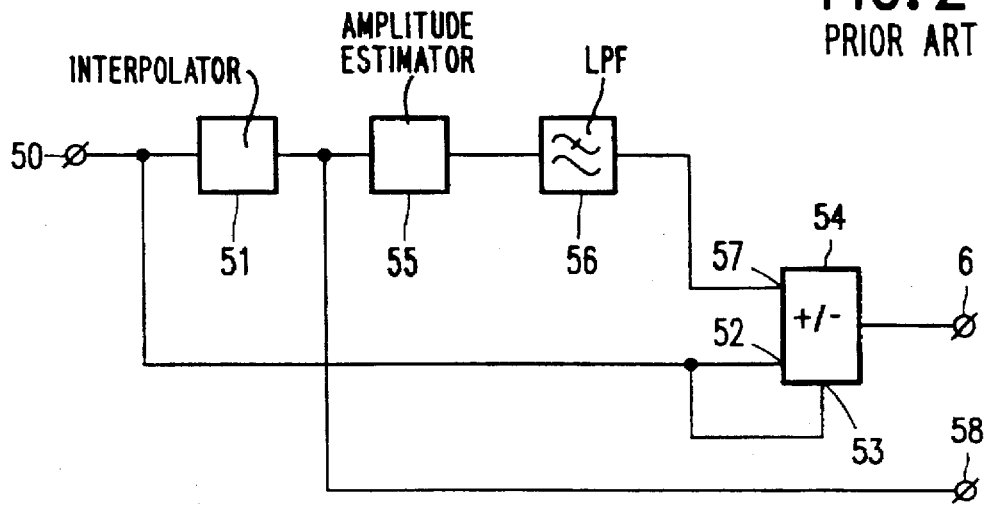
FIG. 3 shows in greater detail the offset generator of FIG. 1.

FIG. 3 shows in more detail the generation of the offset value. The offset generator 5 has an input 50 to which the output 4 of the subtractor 3 is connected. The input 50 is connected to the input of an interpolator 51 and to first and second inputs 52 and 53 of an adder/subtractor 54. The output of the interpolator 51 is fed to an amplitude estimator 55 whose output is fed via a low pass filter 56 to a third input 57 of the adder/subtractor 54. The output of the adder/ subtractor 54 is fed to the output 6 of the offset generator. In addition the output of the interpolator 51 is fed to an output 58 for optional connection to the quantiser 9.

The interpolator is present since the teletext data sampling rate is comparatively low and consequently samples will often not coincide with peaks of the transmitted waveform. The interpolator 51 is used to recreate the waveform for feeding to the amplitude estimator 55 which will produce a value for the data amplitude which is averaged over a long time period (several television field periods) by the filter 56. The interpolated waveform may also be fed to the quantiser 9 together with appropriate timing signals to generate the data stream. The fixed offset at the third input 57 of the adder/subtractor 54 is added to or subtracted from the sliced data at the output of the subtractor 3 depending on the value of the most significant bit of the sliced data which is fed to the second input 53 of the adder/subtractor 54, the second input being a control input which determines whether the unit performs an addition or subtraction function. The remaining bits of the output of the subtractor 3 are applied to the first input 52 of the adder/subtractor 54. This, in conjunction with the filter 7 will give a short term averaging of the slicing level.

This known data slicer is particularly suited to NRZ data. When, however, a signal with many transitions is sliced in this way small offsets can build up to cause an erroneous slicing level, particularly if the "eye height" is low. Thus the offset method described above is not ideal for such signals. In order to reliably slice such data signals as VPS and PAL plus signalling data which are both transmitted as biphase coded signals a zero offset method has been found to be preferable. The optimum slicing level is, however, still obtained at the start of a data packet by applying the offset method.

Figure 4:
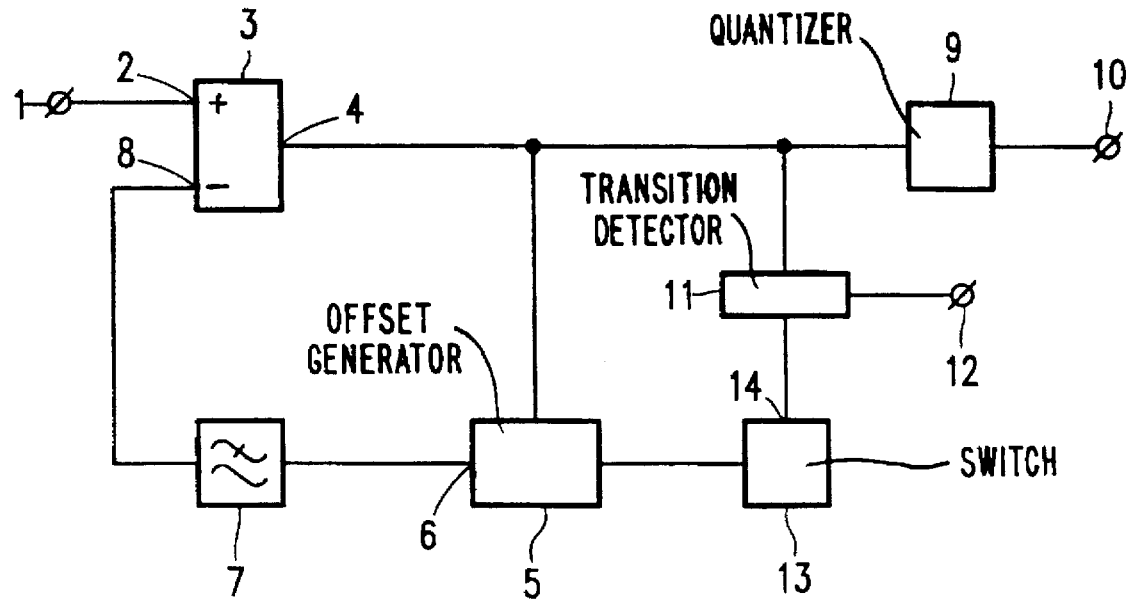
FIG. 4 shows a first embodiment of a data slicer according to the invention.

FIG. 4 shows an embodiment of a data slicer according to the invention which is based on the known data slicer but modified to improve its performance when slicing data having a high transition frequency. In FIG. 4 those elements having a corresponding function to those in FIG. 1 have been given the same reference numerals. The data slicer shown in FIG. 4 is additionally provided with a transition detector 11 which is fed with a timing signal via an input 12 to enable it to detect the first data transition in a line and to latch that result for the period of the timing signal at input 12. The timing signal will typically extend from just before until just after the clock run in period for teletext signals or for a predetermined portion, which includes the time during which a data packet is due to be received, of a line period in the case of biphase or other data signals having a high transition frequency. These timing signals will be generated elsewhere in a teletext decoder or other portions of a television receiver in conventional fashion.

The output of the transition detector is fed to a switch 13 as a control input 13 and will together with the switch 14 cause the offset generator 5 to apply a zero offset to the subtractor 3 via the filter 7.

Thus the operation of the data slicer shown in FIG. 4 differs from that shown in FIG. 1 in the following ways. In the FIG. 1 version a fixed offset level is generated from the long term observation of the data amplitude and is used to slice the data with a short term adjustment of the level by the d.c. loop depending on the amplitude of the sliced output. In the FIG. 4 version the fixed offset level is applied until the first transition is detected, a zero offset is then applied either for the clock run in period for teletext transmissions or for the whole of the data packet for biphase data, and finally for teletext transmissions the fixed offset is reapplied for the rest of the teletext data. In this description teletext transmission is used to cover all data transmissions which use a non return to zero code whether or not the data complies with any teletext standard or even represents text and biphase is used for all data transmissions where a high transition frequency occurs regardless of whether the code is truly biphase and where these terms are used they should be deemed to include all other codes having in the first case a low transition frequency and in the second case a high transition frequency.

Figure 5:
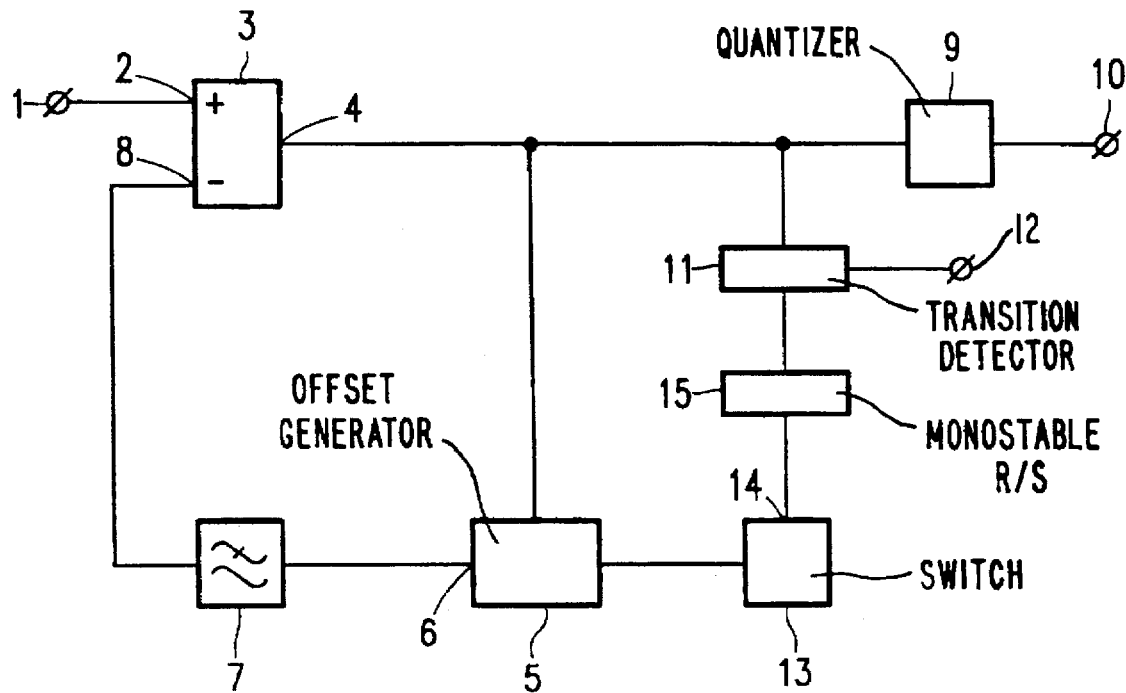
FIG. 5 shows a second embodiment of a data slicer according to the invention.

A further modification of the arrangement shown in FIG. 4 is shown in FIG. 5. In the arrangement shown in FIG. 5 the transition detector 11 is arranged to detect every transition in a line rather than only the first transition. The output of the transition detector 11 is fed to a monostable circuit 15 to trigger it to be set for one or more data periods and whose output operates the switch 13 to cause a zero offset to be applied for the period the monostable circuit 15 is set. The period for which the monostable circuit 15 is set is conveniently a multiple of the data bit period as a clocking signal at this frequency will be readily available. The number of bit periods selected depends on the desired characteristics of the decoder but will need to be kept sufficiently small so as to minimise the effect on NRZ codes where the slicing level will tend to droop if zero offset is applied for too many clock periods, say more than four. It should also not be too short since there is not necessarily a transition every clock cycle for a biphase signal but an offset should not be applied for such signals since it is known that a transition will occur at least once in every two bit periods. Thus a time of two data periods would be sufficient for true biphase signals but a shorter time might be acceptable for other data transmission codes which might have even more transitions.

From reading the present disclosure, other modifications will be apparent to persons skilled in the art. Such modifications may involve other features which are already known in the design, manufacture and use of apparatus for slicing data signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

I claim:

1. A data slicer for generating a digital data stream from teletext and/or other data signals transmitted during given lines of a television signal, the data slicer comprising:
   a subtractor having a first input for receiving the transmitted data signal,
   an offset generator, having an input connected to the output of the subtractor, and an output,
   means for coupling the output of the offset generator to a second input of the subtractor via a low pass filter,
   means for deriving the digital data stream from the output of the subtractor,
   means for generating a first offset value related to the average data amplitude over a given period,
   means for generating a second offset value which is independent of the average data amplitude, and,
   means for selecting between the first and second offset values to form the output of the offset generator,
   characterized in that the means for selecting between the first and second offset values is dependent upon the frequency of transitions of the data stream.

2. A data slicer as claimed in claim 1 further comprising means for detecting each data transition in the given television lines or a predetermined portion of each given line and selecting the second offset value for a short time after each transition, said short time being less than or equal to four bit periods.

3. A data slicer as claimed in claim 2 in which the short time is less than or equal to two bit periods.

4. A teletext decoder including a data slicer as claimed in claim 1.

5. The teletext decoder as claimed in claim 4, wherein the data slicer comprises means for detecting each data transition in the given television lines or a predetermined portion of each given line and applying a zero offset for a short time after each transition said short time being less than or equal to four bit periods.

6. The teletext decoder as claimed in claim 4, wherein the short time is less than or equal to two bit periods.

7. A data slicer for generating a digital data stream from data signals transmitted during given lines of a television signal, said transmitted signals being of a symmetric type or a non-symmetric type, said symmetric type having a uniform number of transitions per time period, said non-symmetric type having a non-uniform number of transitions per time period, said data slicer comprising:
   means for generating a first offset value in dependence upon the transmitted data signals,
   means for generating a second offset value which is independent of the transmitted data signals,
   means for selecting between the first offset value and the second offset value in dependence upon whether the transmitted data signals are of the symmetric type or the non-symmetric type, to provide a selected offset value,
   means for comparing the transmitted data signals to the selected offset value to produce a slice value, and,
   means for deriving the digital data stream from the slice value.

8. A data slicer as in claim 7, wherein the symmetric type of transmitted signals are RZ (Return to Zero) signals, and the non-symmetric type are NRZ (Non-Return to Zero) signals.

9. A data slicer as in claim 7, further comprising means for determining whether the transmitted data signals are of the symmetric or the non-symmetric type.

10. A data slicer as in claim 9, wherein the determination of whether the transmitted data signals are of the symmetric or the non-symmetric type is dependent upon the frequency of transitions of the transmitted data signals.

* * * * *